US009536656B2

(12) United States Patent
Oettinger et al.

(10) Patent No.: US 9,536,656 B2
(45) Date of Patent: Jan. 3, 2017

(54) SYSTEMS AND METHODS OF REDUCTION OF PARASITIC LOSSES IN A WIRELESS POWER SYSTEM

(71) Applicant: Texas Instruments Incorporated, Dallas, TX (US)

(72) Inventors: Eric Gregory Oettinger, Rochester, MN (US); Vladimir Alexander Muratov, Manchester, NH (US); Ravindra Krishna Patil, Plano, TX (US); Kalyan Siddabattula, Plano, TX (US); William Ford Waters, III, Portland, OR (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 750 days.

(21) Appl. No.: 13/891,168

(22) Filed: May 9, 2013

(65) Prior Publication Data
US 2013/0307348 A1    Nov. 21, 2013

Related U.S. Application Data

(60) Provisional application No. 61/649,788, filed on May 21, 2012, provisional application No. 61/649,799, filed on May 21, 2012.

(51) Int. Cl.
*H01F 38/00* (2006.01)
*H01F 38/14* (2006.01)
(Continued)

(52) U.S. Cl.
CPC ............. *H01F 38/14* (2013.01); *H02J 7/0029* (2013.01); *H02J 7/025* (2013.01)

(58) Field of Classification Search
USPC ........................................................ 307/104
See application file for complete search history.

(56) References Cited

U.S. PATENT DOCUMENTS 5,831,348 A    11/1998  Nishizawa
6,140,801 A    10/2000  Aoki et al.
(Continued)

FOREIGN PATENT DOCUMENTS

CN    101447683 B    5/2012
JP    A-2000-32684    1/2000
(Continued)

OTHER PUBLICATIONS

PCT Search Report mailed May 3, 2012.
(Continued)

*Primary Examiner* — Rexford Barnie
*Assistant Examiner* — Dru Parries
(74) *Attorney, Agent, or Firm* — William B. Kempler; Chares A. Brill; Frank D. Cimino

(57) ABSTRACT

Example embodiments of the systems and methods of reduction of parasitic losses in a wireless power system disclosed herein provide a practical means of accurately estimating parasitic losses in a wireless power transfer system irrespective of coupling. Such systems and methods may be used to generate an equation which predicts parasitic losses in a wireless power system. In an offset case, in which the transmitter and receiver are not directly coupled, losses associated with the recirculating current in the primary LC tank dominate the loss, and the transmitted power may be better estimated by measuring the power inputs, power outputs, and injected losses in a controlled environment; making a mathematical fit to an equation, which from the various power measurements and injected loss, predicts the expected transmitter losses; and then, in an operational environment, using the equation to predict parasitic losses based on the power inputs, power outputs and expected loss equation.

15 Claims, 4 Drawing Sheets

(51) Int. Cl.
*H02J 7/00* (2006.01)
*H02J 7/02* (2016.01)

(56) References Cited

U.S. PATENT DOCUMENTS

| | | | |
|---|---|---|---|
| 6,683,438 | B2 | 1/2004 | Park et al. |
| 7,239,103 | B2 | 7/2007 | Ho |
| 8,102,147 | B2 | 1/2012 | Jung |
| 2007/0216392 | A1 | 9/2007 | Stevens et al. |
| 2008/0197804 | A1 | 8/2008 | Onishi et al. |
| 2009/0140691 | A1 | 6/2009 | Jung |
| 2010/0123430 | A1 | 5/2010 | Kojima et al. |
| 2011/0057606 | A1* | 3/2011 | Saunamaki ............ H02J 7/025 320/108 |
| 2011/0270462 | A1 | 11/2011 | Amano et al. |
| 2012/0077537 | A1 | 3/2012 | Muratov et al. |
| 2013/0094598 | A1* | 4/2013 | Bastami ................ H02J 5/005 375/259 |
| 2013/0169224 | A1 | 7/2013 | Terao et al. |
| 2013/0182461 | A1* | 7/2013 | Muratov ................ H02M 3/24 363/15 |

FOREIGN PATENT DOCUMENTS

| | | |
|---|---|---|
| JP | A-2005-311570 | 11/2005 |
| JP | A-2006-238692 | 9/2006 |
| JP | A-2006-340541 A | 12/2006 |
| JP | A-2009-136133 | 6/2009 |
| JP | A-2010-119246 | 5/2010 |
| KR | 1020070104777 | 10/2007 |
| WO | WO2009081115 A1 | 7/2009 |
| WO | WO2010055381 A1 | 5/2010 |
| WO | WO2012040530 A2 | 3/2012 |

OTHER PUBLICATIONS

JP-A-2006-340541, English Machine Translation (17 pages).
JP-A-2005-311570, English Machine Translation (11 pages).
Office Action for Japanese Application No. 2013-530336, English Translation, Jun. 23, 2015 (8 pages).
Office Action for Chinese Patent Publication No. CN 103053093, English Translation, mailed Jul. 10, 2015 (8 pages).
CN101447683B, English Machine Translation, Part 1 (20 pages).
CN101447683B, English Machine Translation, Part 2 (24 pages).

* cited by examiner

SYSTEMS AND METHODS OF REDUCTION OF PARASITIC LOSSES IN A WIRELESS POWER SYSTEM

CROSS-REFERENCE TO RELATED APPLICATION

This application claims benefit to U.S. provisional patent application Ser. No. 61/649,788, filed on May 21, 2012 and to U.S. provisional patent application Ser. No. 61/649,799, filed on May 21, 2012, which are incorporated by reference herein.

TECHNICAL FIELD

The present disclosure is generally related to electronics and, more particularly, is related to wireless power transfer.

BACKGROUND

Wireless energy transfer or wireless power is the transmission of electrical energy from a power source to an electrical load without interconnecting wires. Wireless transmission is useful in cases where interconnecting wires are inconvenient, hazardous, or impossible. Wireless power differs from wireless telecommunications, where the signal-to-noise ratio (SNR) or the percentage of energy received becomes critical only if it is too low for the signal to be adequately recovered. With wireless power transmission, efficiency is the more important parameter.

Two common forms of coupling in wireless power transmission are inductive coupling and resonant inductive coupling. A wireless power transfer system usually consists of electromagnetically coupled transmitting and receiving coils. Due to coil coupling, energy from the primary side can be transferred to the secondary side over a distance. Electromagnetic induction wireless transmission techniques are near field over distances comparable to a few times the diameter of the device or devices approaching one quarter of the wavelength used. Near field energy itself is non-radiative but some radiative losses do occur. In addition there are usually resistive losses. Energy transfer by induction is usually magnetic but capacitive coupling may also be achieved.

Electromagnetic induction works on the principle of a primary coil generating a predominantly magnetic field and a secondary coil being within that field so that a current is induced in the secondary. Coupling should be tight in order to achieve high efficiency. As the distance from the primary is increased, more and more of the magnetic field misses the secondary. Even over a relatively short range the induction method is rather inefficient, wasting much of the transmitted energy.

The action of an electrical transformer is the simplest instance of wireless power transmission by induction. The primary and secondary circuits of a transformer are not directly connected. Energy transfer takes place by electromagnetic coupling through a process known as mutual induction. Principal functions are stepping the primary voltage either up or down and electrical isolation. Mobile phone and electric toothbrush battery chargers, and electrical power distribution transformers are examples of how this principle is used. Induction cookers use this method. The main drawback to this basic form of wireless transmission is short range. The receiver must be directly adjacent to the transmitter or induction unit in order to efficiently couple with it.

Common uses of resonance-enhanced electrodynamic induction are charging the batteries of portable devices such as laptop computers, cell phones, medical implants, and electric vehicles. Resonance may be used in both the wireless charging pad (the transmitter circuit) and the receiver module (embedded in the load) to maximize energy transfer efficiency. This approach is suitable for universal wireless charging pads for portable electronics such as mobile phones. It has been adopted as part of the Qi wireless charging standard. It is also used for powering devices having no batteries, such as RFID patches and contactless smartcards, and to couple electrical energy from the primary inductor to the helical resonator of Tesla coil wireless power transmitters.

Qi is the technical specification of a system for inductive charging that uses the protocol established by the Wireless Power Consortium (WPC). Qi establishes a common language for inductive chargers and devices to talk to one another. So any device with a Qi-enabled accessory or with Qi built directly into it can charge on any Qi inductive charging pad.

Inductive charging is what happens when two devices—one designed to send power and the other designed to receive it—touch one another and energy is transferred between them. In the past, these two devices had to be designed specifically for each other; but devices and chargers designed to support the standard established by the WPC can be freely interchanged. The WPC standard allows the universal charging of compliant smartphones, cameras, mp3 players and anything else with compatible power requirements without directly plugging in those devices. By using an electromagnetic field to transfer energy, charging pads are able to intelligently communicate back and forth with the devices they are charging.

SUMMARY

Example embodiments of the present disclosure provide systems of reduction of parasitic losses in a wireless power system. Briefly described, in architecture, one example embodiment of the system, among others, can be implemented as follows: a transmitter in a wireless power system configured to: transmit power to a receiver; receive information regarding the presence of a parasitic loss in the wireless power system; and reduce the power transmitted to a non-zero level.

Embodiments of the present disclosure can also be viewed as providing methods for reduction of parasitic losses in a wireless power system. In this regard, one embodiment of such a method, among others, can be broadly summarized by the following steps: transferring power from a transmitter to a receiver in a wireless power system; determining a presence of a parasitic loss in the wireless power system; and reducing the power transmitted from a transmitter to a non-zero level.

DETAILED DESCRIPTION

Figure 1:
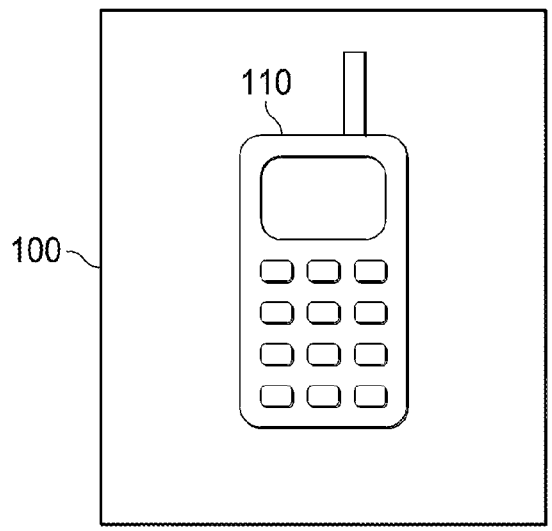
FIG. 1 is a system diagram of an example embodiment of wireless power transfer.

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

With wireless charging, the receiving part of the system may periodically communicate to the primary side the voltage, current, and power levels it is operating at, for example, as well as corrective actions required from the primary side to keep secondary power parameters within desired operating ranges. Performance of such systems may be significantly degraded when parasitic metal objects incidentally or purposely come in close proximity to the transmitting coil. Some of the transmitted energy may be coupled by these metal objects and wasted as heat. This not only degrades the system performance but may also create a danger as the metal objects like coins and keys may get hot enough to create a fire hazard, to cause plastic parts deformation, or operator skin burns when touched.

Systems and methods of wireless power transfer system with interference detection detect possible excessive energy transfer associated with parasitic metal objects placed in close proximity with system coils by comparing power received on the receiving side of the system with the power consumed on the primary side. If the result of such comparison shows that power consumed on the primary side substantially exceeds power received on the secondary side, the system makes a decision to terminate operation, actively preventing adverse effects from developing.

Systems and methods of a wireless power transfer system with interference detection may comprise a primary side coupled to the input source of electrical energy, for example, a primary DC source; semiconductor circuitry that transforms the input power into electromagnetic energy that excites the transmitting coil and gets transmitted toward the receiving coil and a receiving coil electromagnetically coupled with the transmitting coil for receiving energy from the transmitting coil. Receiver circuitry may make use of the received energy and condition parameters to be used by the load. The load may be coupled to the secondary side and consumes some portion of the energy coupled by the receiving coil. The secondary side circuitry may monitor received energy and periodically report parameters of received energy to the transmitting circuitry in an attempt to achieve closed loop regulation of energy parameters on the secondary side.

The secondary side measurement circuitry may sense power received by the secondary side. The primary side measurement circuitry may sense power consumed on the primary side. The modulation circuitry may be placed on the secondary side and may be capable of altering the electromagnetic field that couples transmitting and receiving coils in the way that binary codes can be sent from the secondary side and received on the primary side. The secondary side controller may be coupled to the secondary side measurement circuitry and the modulation circuitry and effectively control these circuits to periodically send binary codes associated with the power received on the secondary side.

The primary side de-modulation circuitry is sensitive to the changes in the electromagnetic energy that couples the transmitting and receiving coils and is capable of demodulating the binary codes sent from the secondary side. The primary side controller coupled to the primary side de-modulation circuitry and the input power measurement circuitry compares the received power value with the consumed power value measured on the primary side and effectively controls or commands system operation based on the result of the comparison. The communication method, if utilized, may include a number of different protocols or means, including transmitting a modulated signal across the coupling, an infrared channel, and a radio frequency channel, among others.

The primary side may compare received power with consumed power and calculate the power associated with parasitic metal objects by performing mathematic functions with received secondary side and measured primary side power levels. The mathematic functions may include scaling of received and measured power levels, deduction of the scaled received power from the scaled measured power, and a deduction of the predetermined constants associated with quiescent power dissipated in the primary and secondary sides. The secondary side may send constants related to known sources of power loss. For example, known sources may include losses due to resistance of the coil or losses in the shield, among others. The shield is typically a magnetic material, for example ferrite, placed behind the coil which provides a return path for the magnetic flux. The shield prevents most of the magnetic field from passing into the device being charged. By directing the field in a desired direction, efficiency is improved. The known parameters may be constant (such as quiescent power), or they may be proportional to power (such as scaling factors). Some factors in the power loss may be non-linear and higher order terms may be involved as well. For example, the losses may be exacerbated by heat—as increased temperature raises the resistance of the coil, the $I^2R$ losses may increase faster than the current.

A decision may be made to completely stop energy transfer if the result of the comparison of the secondary power to the primary power exceeds some predetermined level. The comparison preferably includes scaling the comparison with the parameters that may be passed from the secondary side to the primary side. The predetermined level at which the system stops energy transfer may be set by user configurable resistors, voltages, or currents coupled to the primary side microcontroller. The predetermined level at which a system stops the energy transfer may be stored in memory accessible by the primary side microcontroller.

The difference between received and consumed power at which the energy transfer is stopped may be sent by the secondary side microcontroller to the primary side microcontroller as binary code by modulating the electromagnetic field that couples the transmitting and the receiving coils. The decision may be made to stop the energy transfer for a temporary predetermined duration of time if the result of the comparison exceeds some arbitrary predetermined level. The time interval for which the system stops energy transfer may be set by user configurable resistor, voltage, or current coupled to the primary side microcontroller. The time duration for which system temporarily stops the energy transfer may be stored in the memory accessible by the primary side microcontroller. The duration for which the energy transfer is stopped may be sent by the secondary side microcontroller to the primary side microcontroller as binary code by modulating the electromagnetic field that couples the transmitting and the receiving coils.

To achieve higher precision, a convention may be established between secondary side and primary side for when the measurements of received power and consumed power will be made. To further improve precision, the power measurements may be made at substantially the same moments of time when the system is most unlikely to experience any disturbance associated with modulation of the electromagnetic field that couples transmitting and receiving coils. To reduce the occurrence of nuisance trips due to noisy readings, the energy transfer may be configured to stop only after several consecutive instances of exceeding the predetermined level. The number of consecutive instances before stopping the energy transfer may be user configurable.

Compared to generic systems for metal object detection based on active surface temperature measurements, the disclosed systems and methods measure and compare power levels on the primary and secondary sides and makes necessary corrections to the system operation if a difference between the primary and secondary side powers exceeds a threshold, for instance, as a non limiting example, a user defined threshold.

One of the purposes of wireless power interference detection is to detect the presence of a parasitic metal in proximity to the charger. To make a universal charger, the Wireless Power Consortium (WPC) was created to set a standard for data transfer or talking from the device to be charged to the charger. One of the challenges that occurs in an example implementation, such as a Qi compliant charger, in which any phone or device which is Qi compliant can be charged, is that other metal objects may interfere with the charger. If the metal objects cause interference, they can heat up and cause problems and damage to the phone, or to the user, heating up, even up to as much as 90 degrees Celsius. The efficiency of the power transfer may be calculated to determine if the received power is sufficiently efficient compared to the primary power, with some standard losses involved. If the receiver does not receive most of what the transmitter sent then it means that there is something in the way which consumes the energy.

FIG. 1 provides an example embodiment of a charging system for a mobile device. Charging system 100 is any type of wireless charger which is powered from, for example, a wall power device, that is configured to charge mobile device 110. Mobile device 110 may include a cell phone, mp3 player, computer, implanted medical sensor, or any other wireless-chargeable device.

Figure 2:
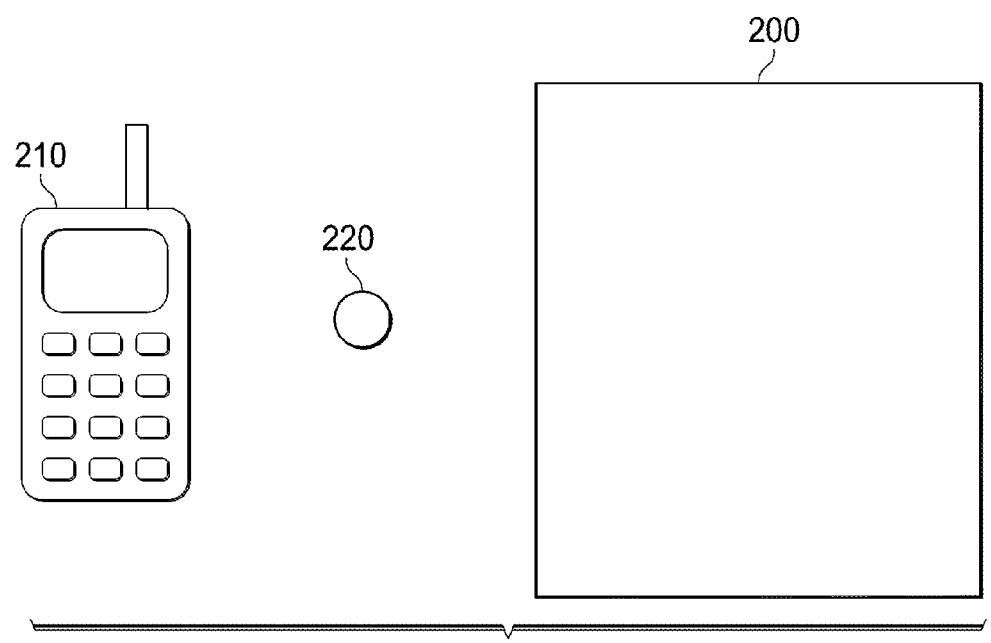
FIG. 2 is a system diagram of an example embodiment of the wireless power transfer of FIG. 1 with an object interfering with the transfer.

FIG. 2 provides a system in which parasitic metal object 220 may interfere with the charging of device 210 with charger 200. When charger 200 tries to transmit energy through, for example, an inductive coupling to device 210, metal object 220 may receive some of that transmitted energy and heat up causing damage to mobile device 210, charger device 200, and metal object 220. If metal object 220 heats up, the heat could cause other damage including fire and burn-damage to a user.

Figure 3:
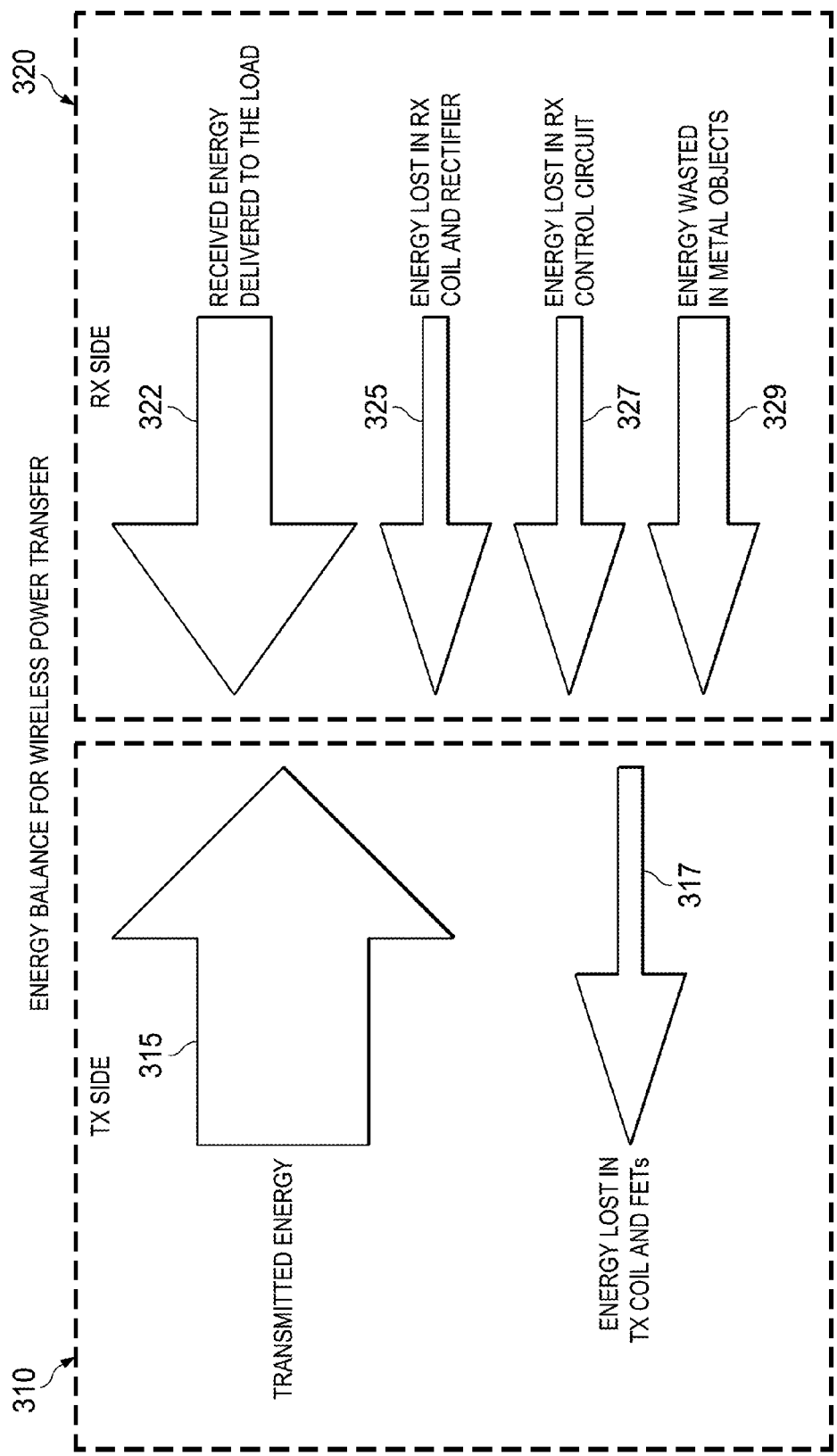
FIG. 3 is a system diagram of an example embodiment of the energy transfer of wireless power transfer with interference detection.

FIG. 3 provides an example of the energy balance used in a system for wireless power transfer with interference detection. Transmit side 310 sends transmitted energy 315 and receives an indication of the energy lost in the transmit coil 317. Receive side 320 transmits the received energy delivered to the load 322. Received side 320 will also transmit the energy lost in the received coil and rectifier 325, and the energy lost in receiver control circuit 327. These known energy terms may be combined into a single "Received Power" message. The energy wasted in metal objects 329 is an unknown quantity which can be calculated by simple addition of the known transmitted and received energy. Transmit side 310 would then calculate the loss and determine if the transfer of energy should be inhibited.

Figure 4:
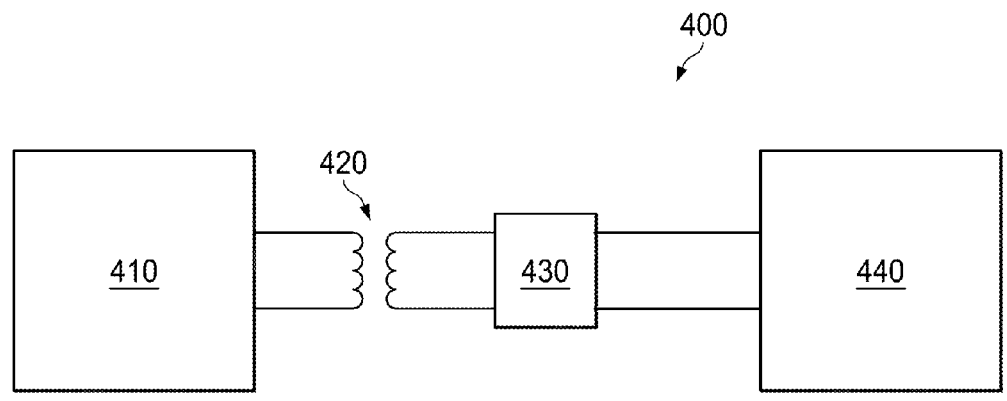
FIG. 4 is a system diagram of an example embodiment of the energy transfer of wireless power transfer with interference detection.

FIG. 4 provides a system diagram of an example of a system for a wireless power transfer with interference detection, for example, the detection of parasitic metal objects. System 400 includes transmitter 410, inductive coupler 420, modulator 430, and secondary side controller 440. Primary side controller 410 transmits energy to secondary side controller 440 through inductive coupling 420. Secondary side controller 440 senses the received power and sends a signal to modulator 430, the signal comprising the secondary power level. Modulator 430 sends that signal through inductive coupling 420 to primary side controller 410. Primary side controller 410 computes the power loss and determines whether the power transfer from primary side 410 to secondary side 440 should be inhibited.

Figure 5:
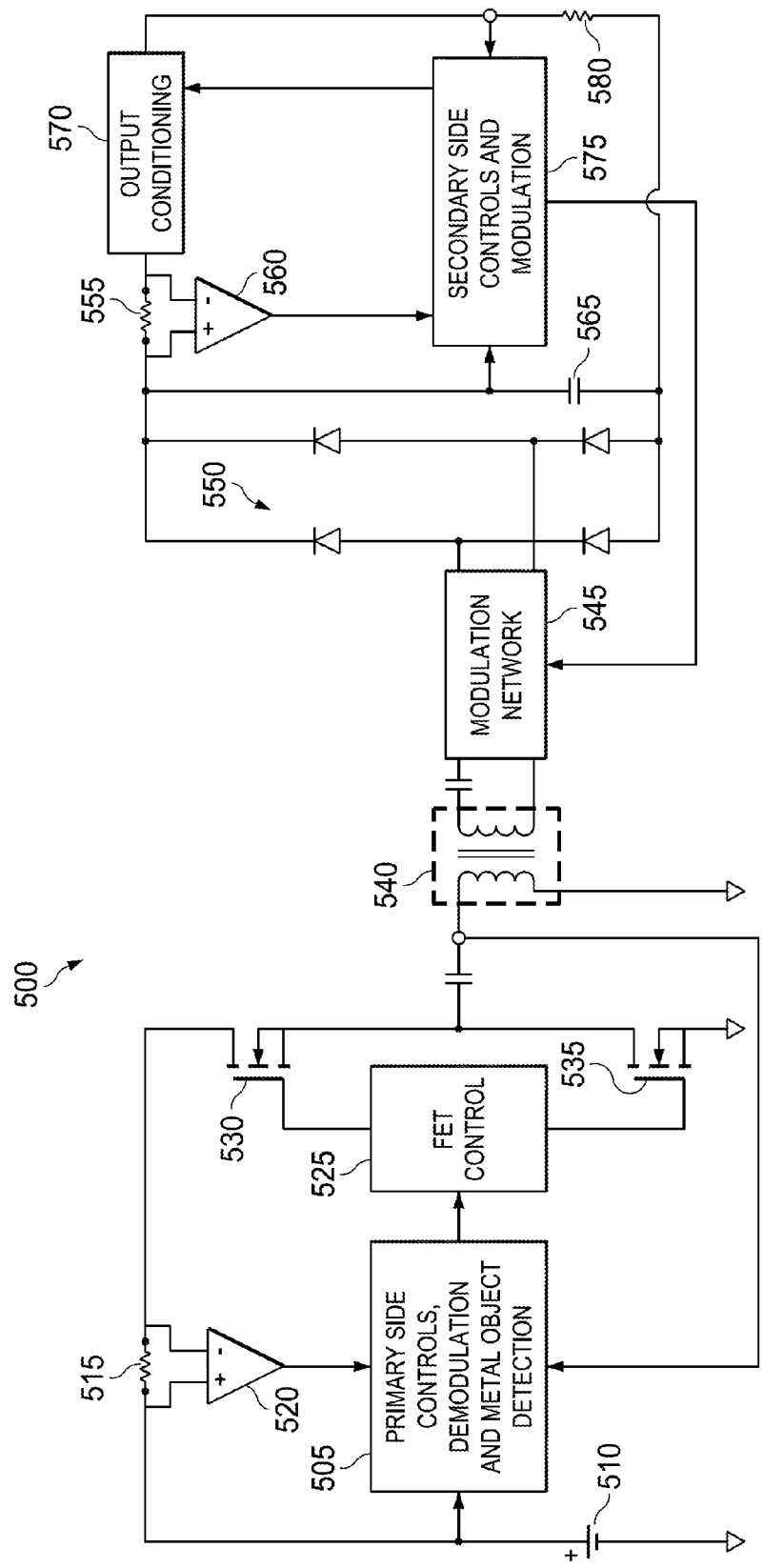
FIG. 5 is a circuit diagram of an example embodiment of the energy transfer of wireless power transfer with interference detection of FIG. 4.

FIG. 5 provides an example of a circuit for wireless power transfer with interference detection. Power source 510 supplies power to system 500. Resistor 515 and amplifier 520 are used to detect the primary side current level; input 502 is used to detect the primary side voltage level. Both may be sensed by primary side controller 505 to calculate a primary side power level. Primary side controller 505 sends a signal to controller 525 to control, in this example, a resonant converter with high side FET 530 and low side FET 535. The power from the primary side is transmitted through wireless coupling 540, for example, through an inductive coupler, to the secondary side. The secondary side may comprise, in this example, rectifier 550 which comprises four diodes. The current on the secondary side may be sensed through current resistor 555 and amplifier 560 and may be presented to secondary side controller 575. Secondary controller 575 may send a signal to output conditioner 570, in this example, to provide power to load 580. Secondary controller 575 receives the current sense input from amplifier 560 and provides a representation of the sensed power level to modulation network 545.

In this example, modulation network 545 sends a binary signal representing the sensed power from current sense resistor 555 and voltage sense 572 through inductive coupler 540 to be received by primary side controller 505. Controller 505 receives the sensed current from the power source 510 by means of amplifier 520 and sense resistor 515. In this example embodiment, primary side controller 505 controls resonant controller 525 with high side FET 530 and low side FET 535. Secondary side controller 575 may communicate through the WPC protocol through modulation network 545 to send the binary coded representation of the received power back through inductive coupler 540 to the primary side, where it may be received by primary side controller 505.

Primary side controller 505 may then calculate the power loss to determine if the efficiency is sufficient to continue charging. If the loss is high enough, a determination may be made that there is something inhibiting the efficient transfer of energy from the primary side to the secondary side and the transfer of energy may be halted. This may be determined by a threshold. The threshold may be preset or it may be user configurable. The modulation types may include but not be limited to amplitude modulation, frequency modulation, phase shift keying, pulse width modulation, and infrared modulation among others.

In previous solutions, interference detection and its associated power loss are estimated. These solutions attempted to detect a metal object in the magnetic field generated for power transfer by looking at the power equation, requiring that all transmitted power be accounted for (a re-stating of the law of conservation of energy), such that transmitted_power=received_power+expected_loss+ unexpected_loss This led to calculating the loss as Loss=$A$*transmitted_power−$B$*received_power−$C$;

where transmitted_power is calculated as input current*input voltage; received_power is the reported value from the device being charged, and C is a constant used to remove any DC offset.

While this approach does a respectable job when the alignment between transmitter coil and receiver coil is constrained to provide ideal coupling, it may lack accuracy when the coupling is changed as occurs when the receiver is placed off-center on the transmitter. In the offset case, losses associated with the recirculating current in the primary LC tank dominate the loss, and the transmitted_power estimate above, which is based purely on input power, may be inaccurate.

One approach to address this shortcoming would consist of precisely measuring the recirculating coil current in the primary winding, and with an accurate knowledge of the series resistance in the resonant circuit, a better calculation of "expected_loss" could be made. Drawbacks to this approach include 1) that measuring current involves either an expensive current transformer, or a resistive sense element in the high current loop which increases damping and impacts system efficiency, and 2) the resistance of the coil should be known (which limits design freedom) and, potentially more problematic, it should be constant—providing no mechanism to handle non-linearities which can be a function of power level or temperature.

Example embodiments of the systems and methods of reduction of parasitic losses in a wireless power system disclosed herein provide a practical means of accurately estimating parasitic losses in a wireless power transfer system irrespective of coupling. Such systems and methods may be used to generate an equation which predicts parasitic losses in a wireless power system. The method, as well as the specific equation (and a related family of equations), are novel to the field of wireless power.

An example embodiment of a method of reduction of parasitic losses in a wireless power system comprises measuring the power inputs, power outputs, and injected losses in a controlled environment; making a mathematical fit to an equation, which from the various power measurements and injected loss, predicts the expected transmitter losses; and then, in an operational environment, using the equation to predict parasitic losses based on the power inputs, power outputs and expected loss equation.

In collecting data, a fixed transmitter may be used to report DC input current, DC input voltage, and the peak voltage seen in the resonant tank. (Note that this peak measurement could really be any linear combination of coil current and capacitor voltage. The voltage here is selected because it may be measured with very little impact on the resonant characteristics of the system.) Other components include a moveable receiver, which may report received power (such as a non-limiting example of a receiver conforming to version 1.1 of the Wireless Power Consortium specification), a variable load on the output of the receiver, and a variable load on the input to the receiver (such as a resistive load on the rectifier for providing a quantifiable proxy for parasitic loss in a real system, thereby providing a measurable loss of which the receiver has no knowledge).

At many different operating points (for example, by using a matrix comprising a sweep of: spatial displacement, output loading, and rectifier loading), example collected parameters include TX_voltage_in, TX_current_in, TX_peak_tank_voltage, RX_rectifier_voltage, RX_rectifier_load (Ohms), and RX reported power ("received_power"). From this data each point may be analyzed using the power loss equation:

TX_power=RX_power+expected_loss+injected_loss where:
  TX_power=TX voltage in*TX current in;
  RX_power=RX reported "received power"; and
  injected_loss=RX rectified voltage$^2$/RX rectifier load (Ohms).

"Expected_loss" may then be calculated on the transmitter without any knowledge of the state of the receiver. In the run-time system, once expected_loss is available, the power equation may be viewed as:

TX_power=RX_power+expected_loss+parasitic_loss where knowledge of parasitic_loss is the goal of the calculation.

While a specific equation is examined here in detail, there is a potential family of related equations which may be applied. Through experimentation, the expected loss has been found to obey the equation:

expected loss=$A$*TX_peak_voltage$^2$+
  $B$*TX_peak_voltage*current_in +
  $C$*TX_current_in$^2$ In matrix form, let X=[A B C], then the power equation may be rewritten as TX_power−RX_power−inject_loss=[peak_voltage$^2$
  (peak_voltage*current_in)current_in$^2$].*X Mathematical software such as Excel or Matlab can be used to generate a least squares fit for the coefficients A, B, and C.

For example, the Matlab statement:

X=lscov([v_peak.^2 v_peak*i_in i_in.^2],rec_pwr+
  inject−(v_in.*i_in));

may be used. For example only, the least square coefficients for data in an example implementation were calculated to be:

X=[A,B,C]=[−3.28011e−010  3.47138e−007−
  0.000502683]

In an example implementation, the output may be incorporated into the transmitter firmware (for example, using fixed point math optimized to prevent over-flow or under-flow issues) to estimate parasitic metal loss in the system.

$$\text{loss} = (v\_in * i\_in) - (32000L * \text{rec\_power}) -$$
$$(((((11541UL * (v\_peak >> 8)) >> 10) * (v\_peak >> 8)) >> 6) +$$
$$(((2982 * iin) >> 16) * (v\_peak >> 7)) -$$
$$((((1054 * iin) >> 10) * iin) >> 4);$$

Other options for the characteristic equation include substituting the resonant tank current for the voltage; including linear terms in addition to the quadratics; including terms which are the cross products between linear and quadratic terms; and including a constant term which could account for system differences (but which can also be accommodated in the threshold against which the estimated loss is compared)

In example embodiments, linearity may be achieved across varying output loads and no temperature sensor is used. Additionally, there is no requirement for an accurate measurement of current in the primary tank which would also add cost. Example embodiments measure the power inputs, power outputs and injected losses in a controlled environment; make a mathematical fit to an equation, which, from the various power measurements and injected loss, predicts the expected transmitter losses; and then, in an operational environment, uses the equation to predict parasitic losses based on the power inputs, power outputs and expected loss equation. A system might, for example include a fixed transmitter which is capable of reporting DC input current, DC input voltage, and the peak voltage seen in the resonant tank (Note that this peak measurement could really be any linear combination of coil current and capacitor voltage. The voltage here is selected because it can be measured with very little impact on the resonant characteristics of the system); a moveable receiver which reports received power (such as a receiver conforming to version 1.1 of the Wireless Power Consortium specification); a variable load on the output of the receiver; and a variable load on the input to the receiver (a resistive load on the rectifier provides a quantifiable proxy for parasitic loss in a real system, providing a measurable loss of which the receiver has no knowledge).

An alternative embodiment of a method of generating the equation for the known losses in the system is to excite the transmitter coil with no receiver present. In this configuration, all measured input power can be considered "known loss", as there is no receiver coupling useful energy, and no foreign objects generating heat. By "open-loop" driving the transmitter over its frequency range of operation and measuring the input current, input voltage and resonant capacitor peak voltage, a least squares fit, for example, may be used to provide a mapping from peak resonant capacitor voltage to input power (Vin*Iin). Thus known losses can be expressed as:

$$known\_loss = [peak\_voltage^2 + peak\_voltage + 1] \cdot *X$$

Mathematical software may again be utilized to determine numerical values for X, which comprises the coefficients A, B and C used in the operational form of the equation.

A further refinement may be added to compensate for component variability such as resistance in different FETS, coils, or resonant capacitors, which may cause a load dependant loss. Experimentally, a term directly proportional to input current has been effective at estimating the additional incurred loss due to resistive variation in the transmitter. The example implementation resulting from this addition takes the form:

$$loss = Vin*Iin - Received\_power - A*V\_peak^2 - B*V\_peak - C - D*Iin.$$

where "D" may be experimentally determined in the operational system to remove any load dependent loss.

As previously provided, a wireless power transfer system (WPTS) comprises an open transformer in which the primary winding is in the power transmitter and the secondary winding is located in the power receiver. Power transfer is achieved by exciting the primary coil with an alternating current which generates a magnetic field. When the receiver is placed in this field, a current is induced in the coil which can be used to power the receiver.

One of the biggest concerns with wireless power is the unintentional heating of "parasitic metal" in the magnetic field. When metallic objects are placed in close proximity to the coils, eddy currents are created and heating results. The parasitic metal can be a foreign object placed in the field near the receiver or even worse, between the transmitter and receiver where the field is strongest. The heating can be significant, making it undesirable from both a device reliability standpoint and, more importantly, from a safety perspective.

The Wireless Power Consortium (WPC) has spent much time and energy considering foreign object detection (FOD), defining a set of reference objects (disk, ring, and foil) with temperature limits which cannot be exceeded if the system is to "pass". While this effort has been thorough and well intentioned, also important may be not just detecting a foreign object, but rather, dealing with "friendly losses" in the system. A circuit board, battery, antenna, or camera exposed to the field will experience heating just like a misplaced coin or gum wrapper.

With a focus on foreign objects, the response to detected power loss has been assumed to be "turn it off". This very effectively stops heating. The problem with turning off the transmitter is that no power is delivered, and when a user picks up their phone in the morning after a nice cool powerless night on the disabled pad, it is not charged.

In the WPC framework, power transfer occurs in a regulated manner with the receiver requesting more or less power as its needs dictate. For example, when charging a battery, the receiver may request more power than when the battery is fully charged. The WPC has defined a protocol for this communication in which the receiver sends a Control Error Packet (CEP) message indicating how much more or less power should be delivered, and the transmitter responds with a corresponding change in output by adjusting some operating parameter such as frequency, duty-cycle or voltage. For example, when the CEP contains a value of +5, it means the receiver is requesting 5% more power, and the transmitter is expected to increase the current in its primary winding by 5% in order to deliver it. The control loop action will drive the CEP to zero.

In addition to CEP messages, the receiver also communicates how much power it receives. Using the REC_PWR information, along with known, characterized system losses and a measure of how much power is being transmitted, the transmitter can estimate how much power is being lost to foreign objects in the field. The relationship between power loss and temperature rise may be measured. For example, a steel disk may be seen to remain under 60° C. if the loss is maintained below 500 mW. Once an acceptable threshold for loss is determined, the transmitter may prevent losses from exceeding that threshold in order to guarantee that the temperature will stay in the acceptable range.

Example embodiments disclosed herein provide less power than the receiver is requesting when the losses approach (or exceed) the threshold. In normal operation, the transmitter drives the CEP value to zero; to deliver less power, the CEP value is driven to something greater than zero such that the receiver is always "starved", receiving less power than it wants. By adjusting the regulation point the amount of power transferred is reduced. Because the inductive power transfer mechanism is the same for both the secondary winding and parasitic metal, this results in proportionally less power going into the parasitic metal producing proportionally less heat.

The offset regulation setpoint (the non-zero CEP reference for closed loop control) may be adjusted based on the proximity of the calculated loss to the threshold, that is, increase the level of power starving as the parasitic losses approach the threshold. Several options exist for controlling the setpoint. In an example embodiment, the setpoint is set with a simple proportional loop. In an alternative embodiment, a more advanced control loop may also be employed in which the reduction in power is increased if the desired reduction in loss is not achieved with a proportionally set offset.

In an example embodiment, the power starving may be accomplished by ignoring CEP messages, and wrapping the control loop around the loss directly. Example embodiments may reduce output power by overriding the normal closed loop control. The power starving may operate over a limited range. Purely proportional control would imply the reduction in output would equal K*(threshold−loss). However, in an example embodiment, power starving may be invoked only if (threshold−loss) is within some predefined range, for example 200 mW.

There may be receivers which cannot handle an input supply lower than what they have requested. That is, they may shut down rather than deliver a reduced output. In this case, application of power starving might cause the system to shut down even in a case where it could have operated below the threshold. For example if the threshold was 500 mW, starving was invoked within 200 mW, and losses are 400 mW. In this case, an example embodiment way invoke power starving after the threshold is exceeded once.

In a multi-coil system, the metal-causing loss (friendly or other) may be located such that it is in the field generated by one coil more than it would be if a different coil was selected for power transfer. For multi-coil systems it may therefore be advantageous to attempt power transfer through alternate coils, before invoking power starving.

In an alternative embodiment, the power starving may be applied in steps. For receivers unable to handle any starving, the application of reduced power may be withheld until the threshold is tripped. At that time, a proportional gain and range of operation may be defined. For example, operation range may be defined as operating within 200 mW with a maximum reduction of 10%. If the loss still exceeds the threshold, the range and/or gain may be increased, for example, to operate within 300 mW with a maximum reduction of 25%. This may happen repeatedly with increasing aggressiveness, or it may be terminated at some point with the realization that heating may not be prevented for the existing situation.

In an example embodiment, when a reduction in output power is determined, a resulting overriding of the normal closed loop control occurs. The offset regulation setpoint (the non-zero CEP reference for closed loop control) may be adjusted based on the proximity of the calculated loss to the threshold (i.e. increase the level of power starving as the losses approach the threshold). Several options exist for controlling the setpoint such as a simple proportional loop and a more advanced control loop in which the reduction in power is increased if the desired reduction in loss is not achieved with a proportionally set offset. The power starving may operate over a limited range. Purely proportional control would imply the reduction in output would equal K*(threshold−loss); however, it may be invoked only if (threshold−loss) is within some predefined range.

Power starving may be used to prevent a foreign object detection (FOD) event before it causes a shutdown. In an example embodiment, a Proportional-Integral (PI) control loop sets the CEP adjustment, rather than using a fixed adjustment, in an attempt to maintain the loss at a level below the FOD threshold. This technique offers a more gradual approach to starving and largely eliminates oscillations, which can be seen with the fixed level approach. For example, if the FOD threshold was 600 mW, the calculated loss may be maintained to below 400 mW. Starving may be increased based on the PI control loop gains. For example, if P=0.05 and I=0.01 and the LOSS was calculated to be 500, the CEP adjustment may be calculated as follows:

Err=500−400=100.

Integrator=Integrator+0.01*Error=1.0

Proportional=0.05*Err=5

CEP_adjustment=Proportional+Integrator=5+1=6.

If the next pass the loss was reduced to 480,

Err=480−400=80.

Integrator=Integrator+0.01*Err=1.0+0.8=1.8

Proportional=0.5*Err=4.0

CEP_adjustment=Proportional+Integrator=4+1.8=5.8

This will eventually result in an integrator that is large enough to drive the Err to 0, operating with the CEP adjustment for maintaining the targeted loss.

Figure 6:
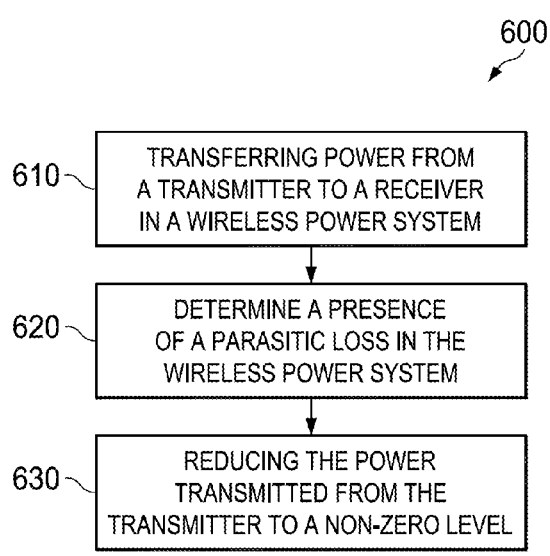
FIG. 6 is a flow diagram, of an example embodiment of a method of reduction of parasitic losses in a wireless power system.

FIG. 6 provides flowchart 600 of a method of reducing parasitic losses in a wireless power system. In block 610, power is transferred from a transmitter to a receiver in a wireless power system. In block 620, the presence of a parasitic loss in the wireless power system is determined. In block 630, the power transmitted from the transmitter is reduced to a non-zero level.

The flow chart of FIG. 6 shows the architecture, functionality, and operation of a possible implementation of the reduction of parasitic loss software. In this regard, each block may represent a module, segment, or portion of code, which comprises one or more executable instructions for implementing the specified logical function(s). It should also be noted that in some alternative implementations, the functions noted in the blocks may occur out of the order noted in FIG. 6. For example, two blocks shown in succession in FIG. 6 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

The logic of the example embodiment(s) may be implemented in hardware, software, firmware, or a combination thereof. In example embodiments, the logic may be implemented in software or firmware that is stored in a memory and that is executed by a suitable instruction execution system. If implemented in hardware, as in an alternative embodiment, the logic can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In addition, the scope of the present disclosure includes embodying the functionality of the example embodiments disclosed herein in logic embodied in hardware or software-configured mediums.

Software embodiments, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer readable medium can be, for example but not limited to, an electronic, magnetic, optical, electromagnetic, infrared, or semiconductor system, apparatus, or device. More specific examples (a nonexhaustive list) of the computer-readable medium would include the following: a portable computer diskette (magnetic), a random access memory (RAM) (electronic), a read-only memory (ROM) (electronic), an erasable programmable read-only memory (EPROM or Flash memory) (electronic), and a portable compact disc read-only memory (CDROM) (optical). In addition, the scope of the present disclosure includes embodying the functionality of the example embodiments of the present disclosure in logic embodied in hardware or software-configured mediums.

Although the present invention has been described in detail, it should be understood that various changes, substitutions and alterations can be made thereto without departing from the spirit and scope of the invention as defined by the appended claims.

Therefore, at least the following is claimed:

1. A method comprising:
transferring power from a transmitter to a receiver in a wireless power system;
measuring input power to the transmitter;
receiving a message from the receiver indicating power received at the receiver;
determining an amount of power lost in the transferring to indicate a presence of a parasitic loss in the wireless power system;
determining a portion of the transferred power attributed to parasitic loss in a foreign object;
reducing the power transmitted from the transmitter to a non-zero level so that the portion of transferred power lost in the foreign object does not exceed a predetermined safe level; and
ignoring messages from the receiver requesting a higher level of transmitted power, wherein the presence of a parasitic loss is determined by comparing measured losses to expected losses, the expected losses determined by measuring system characteristics in a controlled environment, by applying a mathematical fit of the system characteristics to an equation for predicting parasitic losses, wherein the equation calculates expected loss as the sum of:
a first constant multiplied by the square of transmitter peak voltage;
a second constant multiplied by the transmitter peak voltage; and
a third constant.

2. The method of claim 1, gradually reducing power transmitted from the transmitter until an acceptable loss threshold is reached.

3. The method of claim 2, further comprising setting the acceptable loss threshold in reference to a value received in a control error packet (CEP) message.

4. The method of claim 3, further comprising ignoring the CEP message and directly controlling based on the parasitic loss.

5. The method of claim 2, further comprising setting a transmit power regulation setpoint at the accepted loss threshold and regulating the transmit power at the transmit power regulation setpoint with a proportional loop.

6. The method of claim 2, wherein the reducing of the power transmitted from the transmitter occurs within a predefined range of parasitic loss.

7. A method comprising:
transferring power from a transmitter to a receiver in a wireless power system;
measuring input power to the transmitter;
receiving a message from the receiver indicating power received at the receiver;
determining an amount of power lost in the transferring to indicate a presence of a parasitic loss in the wireless power system;
determining a portion of the transferred power attributed to parasitic loss in a foreign object;
reducing the power transmitted from the transmitter to a non-zero level so that the portion of transferred power lost in the foreign object does not exceed a predetermined safe level; and
ignoring messages from the receiver requesting a higher level of transmitted power, wherein the presence of a parasitic loss is determined by comparing measured losses to expected losses, the expected losses determined by measuring system characteristics in a controlled environment, by applying a mathematical fit of the system characteristics to an equation for predicting parasitic losses, wherein the equation calculates expected loss as the sum of:
a first constant multiplied by the square of transmitter peak voltage;
a second constant multiplied by the transmitter peak voltage;
a third constant; and
a fourth constant multiplied by input current.

8. A system comprising:
a transmitter in a wireless power system configured to:
transmit power to a receiver;
measuring input power to the transmitter;
receiving a message from the receiver indicating power received at the receiver;
determining the presence of a parasitic loss in the wireless power system;
determining a portion of the transferred power attributed to parasitic loss in a foreign object;
reduce the power transmitted to a non-zero level so that the portion of transferred power lost in the foreign object does not exceed a predetermined safe level; and
ignoring messages from the receiver requesting a higher level of transmitted power, wherein the presence of a parasitic loss is determined by comparing measured losses to expected losses, the expected losses determined by measuring system characteristics in a controlled environment, by applying a mathematical fit of the system characteristics to an equation for predicting parasitic losses, wherein the equation calculates expected loss as the sum of:
a first constant multiplied by the square of transmitter peak voltage;
a second constant multiplied by the transmitter peak voltage;
a third constant; and
a fourth constant multiplied by input current.

9. The system of claim 8, wherein the transmitter is further configured to gradually reduce the power transmitted from the transmitter until an acceptable loss threshold is reached.

10. The system of claim 9, wherein the transmitter is further configured to set the acceptable loss threshold in reference to a value received in a control error packet (CEP) message.

11. The system of claim 10, wherein the transmitter is further configured to ignore the CEP message and directly control the transmitted power based on the parasitic loss.

12. The system of claim 9, wherein the transmitter is further configured to set a transmit power regulation setpoint at the accepted loss threshold and regulate the transmit power at the transmit power regulation setpoint with a proportional loop.

13. The system of claim 9, wherein the transmitter is configured to reduce the power transmitted from the transmitter when the parasitic loss is within a predefined range.

14. A system comprising:
a transmitter in a wireless power system configured to:
transmit power to a receiver;
measuring input power to the transmitter;
receiving a message from the receiver indicating power received at the receiver;
determining the presence of a parasitic loss in the wireless power system;
determining a portion of the transferred power attributed to parasitic loss in a foreign object;
reduce the power transmitted to a non-zero level so that the portion of transferred power lost in the foreign object does not exceed a predetermined safe level; and
ignoring messages from the receiver requesting a higher level of transmitted power, wherein the presence of a parasitic loss is determined by comparing measured losses to expected losses, the expected losses determined by measuring system characteristics in a controlled environment, by applying a mathematical fit of the system characteristics to an equation for predicting parasitic losses wherein the equation calculates expected loss as the sum of:
a first constant multiplied by the square of transmitter peak voltage;
a second constant multiplied by the transmitter peak voltage and the transmitter input current; and
a third constant.

15. A system comprising:
means for transmitting power to a receiver;
means for measuring input power to the transmitter;
means for receiving a message from the receiver indicating power received at the receiver;
means for determining the presence of a parasitic loss in the wireless power system;
means for determining a portion of the transferred power attributed to parasitic loss in a foreign object;
means for reducing the power transmitted to a non-zero level so that the portion of transferred power lost in the foreign object does not exceed a predetermined safe level; and
means for ignoring messages from the receiver requesting a higher level of transmitted power; further comprising means for determining the presence of a parasitic loss by comparing measured losses to expected losses, the expected losses determined by measuring system characteristics in a controlled environment, by applying a mathematical fit of the system characteristics to an equation for predicting parasitic losses, wherein the equation calculates expected loss as the sum of:
a first constant multiplied by the square of transmitter peak voltage;
a second constant multiplied by the transmitter peak voltage; and
a third constant.

* * * * *